United States Patent
Heinrich (10) Patent No.: US 11,114,889 B2
(45) Date of Patent: Sep. 7, 2021

(54) ELECTRONIC CIRCUIT FOR REDUNDANT SUPPLY OF AN ELECTRIC LOAD

(71) Applicant: Aptiv Technologies Limited, St. Michael (BB)

(72) Inventor: Markus Heinrich, Wiehl (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/660,357

(22) Filed: Oct. 22, 2019

(65) Prior Publication Data
US 2020/0136427 A1    Apr. 30, 2020

(30) Foreign Application Priority Data

Oct. 31, 2018  (EP) .................................... 18203854

(51) Int. Cl.
| | | |
|---|---|---|
| *H02J 9/06* | (2006.01) | |
| *G06F 1/30* | (2006.01) | |
| *H02J 7/34* | (2006.01) | |
| *B60L 3/00* | (2019.01) | |
| *B60R 16/04* | (2006.01) | |

(52) U.S. Cl.
CPC ............ *H02J 9/061* (2013.01); *B60L 3/0092* (2013.01); *G06F 1/30* (2013.01); *H02J 7/34* (2013.01); *B60L 3/00* (2013.01); *B60R 16/04* (2013.01)

(58) Field of Classification Search
CPC ...... H02J 9/06; H02J 9/062; H02J 9/00; H02J 1/10; H02J 7/34; B60L 3/0092; G06F 11/2015; G06F 1/30; G06F 1/26; G06F 1/28; B60R 16/04

USPC .................. 307/64, 66, 80, 82, 43, 9.1, 10.1
See application file for complete search history.

(56) References Cited

U.S. PATENT DOCUMENTS

| | | | |
|---|---|---|---|
| 4,659,942 A | 4/1987 | Volp | |
| 7,595,569 B2 * | 9/2009 | Amerom | H02M 1/10 307/82 |
| 2004/0192407 A1 | 9/2004 | Formenti | |
| 2005/0078424 A1 * | 4/2005 | Yamamura | H02J 1/10 361/91.1 |

(Continued)

FOREIGN PATENT DOCUMENTS

| | | |
|---|---|---|
| EP | 1 355 401 A2 | 10/2003 |
| EP | 2 624 402 A2 | 8/2013 |

*Primary Examiner* — Rexford N Barnie
*Assistant Examiner* — Jagdeep S Dhillon
(74) *Attorney, Agent, or Firm* — Colby Nipper PLLC (57) ABSTRACT

An electronic circuit for redundant supply of an electric load comprises a plurality of terminals including at least a first terminal, a second terminal and at least one third terminal, wherein the first terminal is configured to be connected to a first energy source for primary supply of the electric load; the second terminal is configured to be connected to a second energy source for secondary supply of the electric load; the at least one third terminal is configured to be connected to the electric load; the electronic circuit further comprises a plurality of electrical components interposed between the first terminal, the second terminal and the at least one third terminal, the electrical components being configured to enable power flow from either the first terminal or the second terminal to the at least one third terminal in dependence of an erroneous supply state for the electric load.

18 Claims, 3 Drawing Sheets

(56) References Cited

U.S. PATENT DOCUMENTS

| | | | | |
|---|---|---|---|---|
| 2010/0261048 | A1* | 10/2010 | Kim | B60L 58/12 |
| | | | | 429/150 |
| 2012/0319483 | A1 | 12/2012 | Scruggs et al. | |
| 2016/0195911 | A1* | 7/2016 | Chapel | H02J 1/14 |
| | | | | 713/340 |
| 2018/0029474 | A1* | 2/2018 | Berels | B60L 58/21 |

* cited by examiner

ELECTRONIC CIRCUIT FOR REDUNDANT SUPPLY OF AN ELECTRIC LOAD

CROSS-REFERENCE TO RELATED APPLICATION

This application claims the benefit under 35 U.S.C. § 119(a) of European Patent Application EP 18203854.7, filed Oct. 31, 2018, the entire disclosure of which is hereby incorporated herein by reference.

TECHNICAL FIELD OF INVENTION

The invention refers to an electronic circuit for redundant supply of an electric load.

BACKGROUND OF INVENTION

In many applications uninterrupted and sufficient supply of one or more electrical loads is required for safety reasons. One such application is in vehicles configured for autonomous driving. The electrical load can be for example a control module configured to carry out a processing task in connection with an autonomous driving feature. Insufficient supply of the control module needs to be avoided with maximum certainty since failure of the control module can lead to accidents including harm of passengers.

Insufficient supply of the electric load can be due to various errors, i.e. erroneous supply states, including shorts and low battery. In case of an erroneous supply state an alternative supply should be provided automatically thereby ensuring sufficient and preferably uninterrupted supply of the load. For this reason two or more energy sources can be provided for the supply of the load, wherein a second energy source (for secondary supply) takes over the supply in case the first energy source (for primary supply) is exhausted or unable to supply due to a short circuit or another erroneous supply state. In other words, a suitable electronic circuit for the supply should have redundant supply capabilities.

One problem associated with redundant supply is that the wiring, i.e. the length and/or amount of electrical connections (i.e. cables) increases, thereby leading to increased cost, increased weight and also to increased vulnerability for shorts. Such increases are, however, undesired, for example in a vehicle. Therefore, an electronic circuit for redundant supply should ensure sufficient supply for the load, i.e. unaffected from erroneous supply states, and should also allow for a reduction of the wiring.

SUMMARY OF THE INVENTION

A problem of the invention is to provide an electronic circuit for redundant supply of an electric load satisfying the aforementioned requirements.

The problem of the invention is solved by an electronic circuit according to claim 1.

An electronic circuit for redundant supply of an electric load comprises a plurality of terminals including at least a first terminal, a second terminal and at least one third terminal. The first terminal is configured to be connected to a first energy source for primary supply of the electric load (for example in a normal or default supply state). The second terminal is configured to be connected to a second energy source for secondary supply of the electric load. The at least one third terminal is configured to be connected to the electric load. The electronic circuit further comprises a plurality of electrical components interposed between the first terminal, the second terminal and the at least one third terminal, wherein the electrical components are configured to enable power flow from either the first terminal or the second terminal to the at least one third terminal in dependence of an erroneous supply state.

The electronic circuit can be configured as an electronic module (optionally having a housing), wherein the first and second terminals are to be connected to the first and second energy sources, respectively. In contrast, the third terminal is connected to the load and can thus be regarded as an output terminal. As a general function, supply of the load should be enabled via the first energy source or the second energy source. However, the load should preferably not be supplied by both energy sources at the same time. In this way, a situation can be avoided in which both energy sources, which preferably are both batteries, are low, i.e. exhausted. In other words, the second energy source should preferably be configured as a back-up supply and should thus preferably not be in operation for supply of the electric load if the first energy is supplying. Furthermore, the circuit can be configured to disable power flow from the second energy source to the first energy source and/or vice versa, thereby avoiding a reverse flow of current between the energy sources.

The electronic circuit allows for a double-pairwise connection between two energy sources, thereby forming a ring structure. In such a configuration, the second terminals of a pair of two electronic circuits are interconnected and the first terminals of the electronic circuits are connected to a first energy source and a second energy source, respectively. Two of such pairs can be connected in parallel, thereby forming the ring (or part of a ladder structure). This allows for a significant reduction of the wiring because the second terminals do not need to be directly connected to the energy sources. Instead, supply of an electric load via a second terminal can be accomplished via the interconnected second terminal and the first terminal of the other electronic circuit of the pair. Therefore, the circuit can generally be configured to enable power flow from the first terminal to the second terminal in dependence of an erroneous supply state. Due to the pairwise configuration between the energy sources the energy sources can be employed for primary and secondary supply at the same time. This will be explained in greater detail further below.

The selective enabling of power flow, i.e. flow of current suitable for the supply, can be accomplished by connecting the at least one third terminal with either the first terminal or the second terminal in dependence of an erroneous supply state for the electric load. As such, the electrical components of the circuit are preferably electrical switches with binary switch states (on/off). The switching states can be controlled in dependence of switching conditions, thereby providing an automatic switching if an erroneous supply state is detected and thus requires a switching of one or more switches. Although other electrical components than switches can be used for providing the selective enabling of power flow (e.g., fuses, diodes) electrical switches are preferred since they allow for convenient resetting. They are also available at a low price. Electrical switches can be formed by transistors. For the electrical circuit presented herein, electrical switches are preferably formed by MOSFETs (metal-oxide-semiconductor field-effect transistors), which may be of the N-type. It is possible that the electrical components, which implement the selective enabling of power flow, are formed by electrical switches only. This reduces production cost for the electronic circuit.

It is understood that when the circuit is installed for desired use neither the first terminal nor the second terminal need to be directly connected to a respective energy source in order to achieve redundant supply. It is possible that further electrical components and/or further circuits are interposed between the first and/or second terminal on the one hand and the first and/or second energy source on the other hand. In this way, indirect electrical connections are also possible.

Embodiments (i.e. variants) of the invention are given in the claims, the description and the figures.

According to one embodiment the electronic circuit further comprises means for detecting an erroneous supply state at the first terminal, wherein the electronic circuit is further configured to connect the first terminal to the at least one third terminal in order to enable power flow from the first terminal to the at least one third terminal and to disconnect the second terminal from the first terminal and the at least one third terminal in order to disable power flow from the second terminal to the first terminal and the at least one third terminal if the erroneous supply state is not detected at the first terminal. In other words, if there is a normal supply state at the first terminal, the load is supplied via the first terminal provided no other erroneous supply state hinders supply via the first terminal. At the same time a reverse flow of current from the second terminal is avoided, thereby ensuring an interference-free supply by means of the first energy source. An erroneous supply state at the first terminal can be that the voltage drops below a predefined threshold, which may be due to exhaustion of the first energy source and/or due to a short. This can be detected, e.g., by a comparison circuit configured to monitor the voltage and/or current with respect to a threshold.

The electronic circuit can be further configured to disconnect the first terminal from the at least one third terminal and the second terminal in order to disable power flow from the first terminal to the at least one third terminal and the second terminal and to connect the second terminal to the at least one third terminal in order to enable power flow from the second terminal to the at least one third terminal if the erroneous supply state at the first terminal is detected. In other words, supply via the first terminal (for primary supply) is disabled and redundant supply via the second terminal is activated, i.e. takes over. Furthermore, reverse flow of power from the second terminal to the first terminal is avoided.

According to another embodiment the plurality of electrical components comprises at least one first electrical component, preferably first electrical switch (Q1), configured to enable power flow from the first terminal to the at least one third terminal and/or to the second terminal. The first electrical component is further configured to disable current flow from the at least one third terminal and the second terminal to the first terminal. Therefore, the first electrical component behaves like a diode, thereby ensuring supply via the first terminal without reverse flow of current ("interference-free supply). The first electrical component can be an electrical switch configured to connect and/or disconnect said terminals in order to enable and/or disable power flow between said terminals as described further above. The first electrical component can be a smart diode.

According to a further embodiment the circuit comprises means for detecting an erroneous supply state at the second terminal, the erroneous supply state at the second terminal preferably comprising that an electrical measurand, preferably current, at the second terminal violates a threshold condition. The plurality of electrical components comprises at least one second electrical component, preferably second electrical switch, configured to enable power flow between the second terminal and the first terminal and/or the at least one third terminal if the erroneous supply state at the second terminal is not detected (normal supply state at the second terminal). The second electrical component is further configured to disable power flow between the second terminal and the first terminal and/or the at least one third terminal if the erroneous supply state at the second terminal is detected. As with the first electrical component the second electrical component can be a switch for connecting and/or disconnecting said terminals in order to enable and/or disable power flow, in particular current. The erroneous supply state at the second terminal can be for example a short, which leads to a drop in current. This can be detected by repeatedly measuring the current and comparing the measured current to a threshold (i.e. by means of a comparison circuit), wherein if the current is above the threshold, an erroneous supply state is detected. The second terminal can then be disabled, i.e. deactivated by disconnecting the second terminal from the other terminals by means of the second electrical element.

The circuit can further comprise means for detecting an erroneous supply state at the first terminal, wherein the erroneous supply state at the first terminal preferably comprises that an electrical measurand, preferably voltage, at the first terminal violates a threshold condition. It is possible to monitor the first terminal only with respect to one erroneous supply state, which may involve drop of voltage and increase of current at the same time. However, different supply states, which can be monitored independently from each other by using separate means or the electrical element itself, are also possible. The plurality of electrical components can further comprise a third electrical component, preferably third electrical switch, configured to enable power flow from the second terminal to the at least one third terminal if the erroneous supply state at the first terminal is detected and to disable power flow from the second terminal to the first terminal and/or the at least one third terminal if the erroneous supply state at the first terminal is not detected (normal supply state at the first terminal). For example if the voltage measured at the first terminal drops below a predefined threshold (i.e. an erroneous supply state is detected at the first terminal) due to, e.g. low battery or a short at the first terminal then the supply via the second terminal can be activated and takes over supply for the electric load. Otherwise, i.e. if the voltage at the first terminal is equal to or above a predefined threshold, the second terminal is preferably in a deactivated state, i.e. disconnected from at least one of the other terminals, preferable both. The third electrical component can be an electrical switch. The third electrical component is preferably configured to enable power flow from the first terminal to the second terminal but not vice versa, i.e. the third electrical component behaves like a diode. In addition, it can be (permanently) switched on in response to an erroneous supply state at the first terminal. As such, the third electrical component can behave like a diode and an ordinary switch connected in parallel between the second terminal and the other terminals, with the ordinary switch being open per default and closed in response to an erroneous supply state at the first terminal.

The third electrical component can be further configured to enable power flow from the first terminal to the second terminal if the erroneous supply state at the first terminal is not detected. This corresponds to a diode functionality mentioned above, wherein if the ordinary switch is open, flow of power is enabled from the first and/or third terminal to the second terminal but not vice versa. In this way it is possible to connect the second terminals of a pair of electronic circuits for reduced wiring, wherein supply of an electric load via two circuits is possible in case an erroneous supply state happens at the first terminal of one of the circuits.

As the case may be, erroneous supply states can also happen at the at least one third terminal, for example a short (i.e., short circuit). For handling such cases the circuit can comprise means for detecting an erroneous supply state at the at least one third terminal, wherein the erroneous supply state at the at least one third terminal preferably comprises that an electrical measurand, preferably current, at the at least one third terminal violates a threshold condition, for example the current rises above a predefined threshold due to an excess current caused by a short. In order to avoid further faults caused by the short the plurality of electrical components can comprise at least one fourth electrical component, preferably fourth electrical switch. In view of normal operation (no fault) said fourth electrical component can be configured to enable power flow between the at least one third terminal and the first terminal and/or the second terminal if the erroneous supply state at the at least one third terminal is not detected. In view of a present fault the fourth component can be configured to disable power flow between the at least one third terminal and the first terminal and/or the second terminal if the erroneous supply state at the at least one third terminal is detected. The fourth electrical component can thus behave like a fuse for protecting the circuit including other circuits and the energy sources.

According to another embodiment the circuit comprises a plurality of third terminals and means for detecting an erroneous supply state at each of the plurality of third terminals, the erroneous supply state at one of the plurality of third terminals preferably comprising that an electrical measurand, preferably current, at the one of the plurality of third terminals violates a threshold condition. The plurality of electrical components of the circuits can comprise a plurality of fourth electrical components, preferably fourth electrical switches, each of the plurality of fourth electrical components connected to one of the plurality of third terminals and configured to enable power flow between the one of the plurality of third terminals and the first terminal and/or the second terminal if the erroneous supply state at the one of the plurality of third terminals is not detected (no fault). However, the fourth electrical switches are further configured to disable power flow between the one of the plurality of third terminals and the first terminal and/or the second terminal if the erroneous supply state at the at the one of the plurality of third terminals is detected. In other words, each of the plurality of third terminals can be protected by its own fuse, thereby allowing a selective deactivation of the third terminals. This ensures that supply of the load is ensured as best as possible in view of potential errors.

The invention further refers to an electronic circuit arrangement comprising a first electronic circuit and a second electronic circuit. These circuits can each be configured according to one of the aforementioned embodiments. In particular, the first and second circuits can be configured in the same way, i.e. the circuits can be identical. As already indicated above, the second terminal of the first electronic circuit can be connected to the second terminal of the second electronic circuit, thereby forming an interconnected pair of electronic circuits. Preferably, the first electronic circuit and the second electronic circuit are interposed between a first energy source and a second energy source in an installation environment. Lower wiring is required compared to the case that each of the first and second terminals are connected to the first and second energy sources, respectively.

The first terminal of the first electronic circuit can be connected to the first energy source via a first protective electrical element, in particular first fuse, and/or wherein the first terminal of the second electronic circuit is connected to the second energy source via a second protective electrical element, in particular second fuse. The first and/or second protective electrical element can be configured to enable power flow through the protective electrical element if an electrical measurand, preferably current, at the protective electrical element meets a threshold condition; and to disable power flow through the protective electrical element when an electrical measurand, preferably current, at the protective electrical element violates the threshold condition. The thresholds for the first and/or second protective element are preferably set to a threshold which is higher than the threshold for the second electrical element of the circuits mentioned further above. This ensures that if the second terminal is disabled, e.g. due to a short at the second terminal, by means of the second electrical element then the first terminal is not disabled due to the protective element connected to the first terminal. Supply via the first terminal thus continues despite the error at the second terminal.

The electronic circuit arrangement can comprise a plurality of pairs of first electronic circuits and second electronic circuits, which are interposed between the first energy source and the second energy source. As such, at least some, preferably each of the plurality of pairs of first electronic circuits and second electronic circuits are connected to the first energy source and the second energy sources via their first terminals, respectively. Two neighboring pairs of circuits form a ring for redundant supply of a plurality of electrical loads, wherein the amount of wiring is reduced. If more than two pairs are used a ladder structure is formed between the two energy sources. Moreover, the first energy source and/or the second energy source can share a first common protective electrical element and/or a second protective electrical element for connecting to the plurality of pairs of first electronic circuits and second electronic circuits, respectively. This also reduces the number of protective elements.

The invention further relates to a method for redundant supply of an electric load in dependence of an erroneous supply state in an electronic circuit, wherein the electronic circuit is preferably configured according to one of the embodiments described above. A first terminal of the electronic circuit is connected to a first energy source for primary supply of the electric load. Accordingly, a second terminal of the electronic circuit is connected to a second energy source for secondary supply of the electric load. The at least one third terminal of the electronic circuit is connected to the electric load. The method comprises enabling power flow from the first terminal to the at least one third terminal and disabling power flow from the second terminal to the first terminal and/or the at least one terminal if an erroneous supply state at the first terminal is not detected. The method further comprises enabling power flow from the second terminal to the at least one third terminal and disabling power flow through the first terminal if an erroneous supply state at the first terminal is detected. It is understood that features, which have been described in connection with the electronic circuits can be realized accordingly as method features in the aforementioned method.

The invention further relates to a method for redundant supply of an electric load in dependence of an erroneous supply state in an electronic circuit arrangement, wherein the electronic circuit arrangement is configured according to one the embodiments described above. The method comprises enabling power flow from the first terminal of the first electronic circuit or the second electronic circuit to the second terminal of the first electronic circuit or the second electronic circuit if an erroneous supply state is detected at the first terminal of the second electronic circuit or the first electronic circuit, respectively. In other words, supply of the load of the second circuit is accomplished via the first circuit if the second circuit has an error at its first terminal. The same holds vice versa if both circuits are the same, as is preferred.

The method further comprises disabling power flow through the second terminals of the first electronic circuit and the second electronic circuit if an erroneous supply state is detected at the second terminal of the first electronic circuit and/or the second electronic circuit. This can be accomplished by the second electronic component mentioned further above, which can be an electronic switch configured to behave like a fuse. Preferably, both electronic circuits have such a second electronic switch configured to switch off in case of an excess current beyond the same threshold. The switches will therefore both switch off essentially at the same time. It is understood that the method can comprise further method features which correspond to any of the functionality described in connection with the circuit.

BRIEF DESCRIPTION OF DRAWINGS

The invention is further described merely by way of example making reference to the figures, wherein FIG. 1 schematically shows an electronic circuit for redundant supply of a load.

In the figures, the same reference signs are used for corresponding elements.

DETAILED DESCRIPTION

Figure 1:
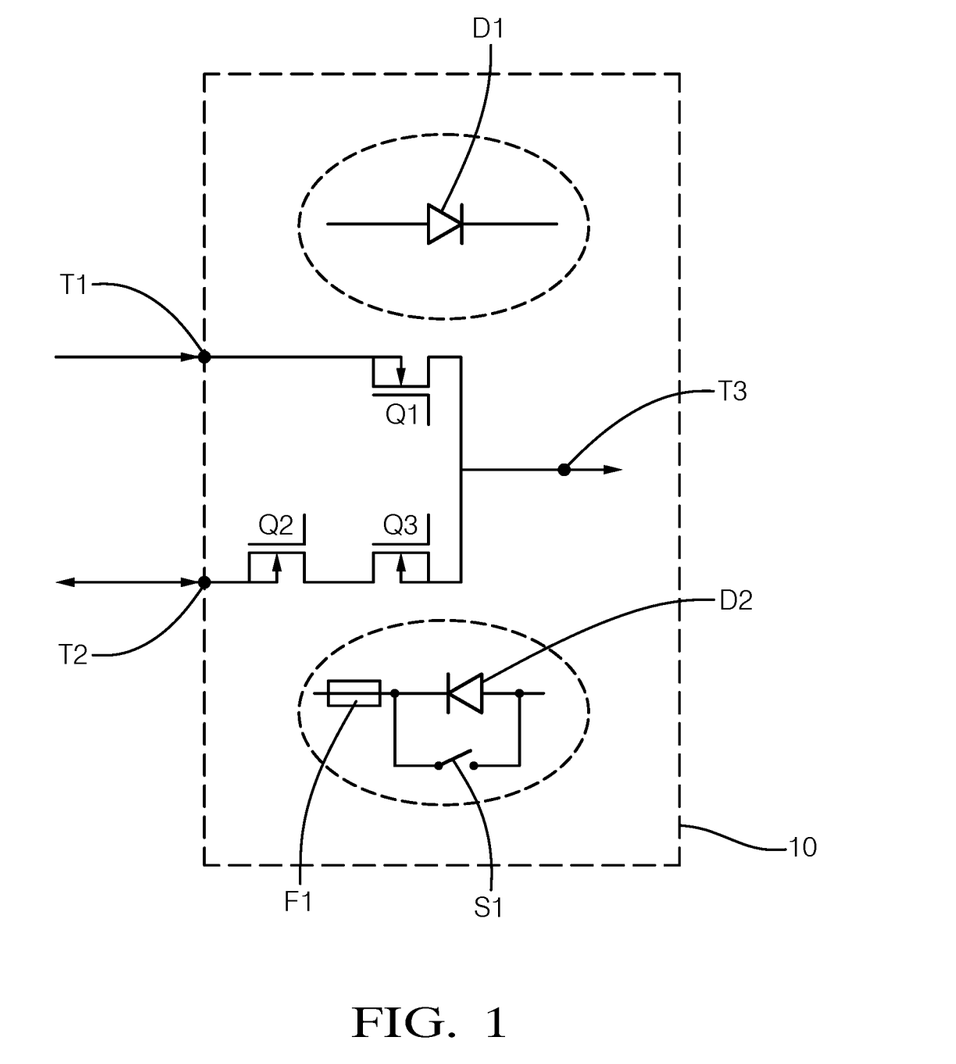

FIG. 1 schematically shows an electronic circuit 10 indicated by dashed lines, wherein the circuit 10 can be configured as an electronic module having a housing (not shown). The circuit 10 comprises a first terminal T1, a second terminal T2 and a third terminal T3. The terminals T1, T2, T3 can be configured as harnesses or generally so as to allow for a pin connection, e.g. by sockets cooperating with plugs or the like. Therefore, the terminals T1, T2, T3 can be regarded as electrical interfaces of the circuit 10.

Figure 3:
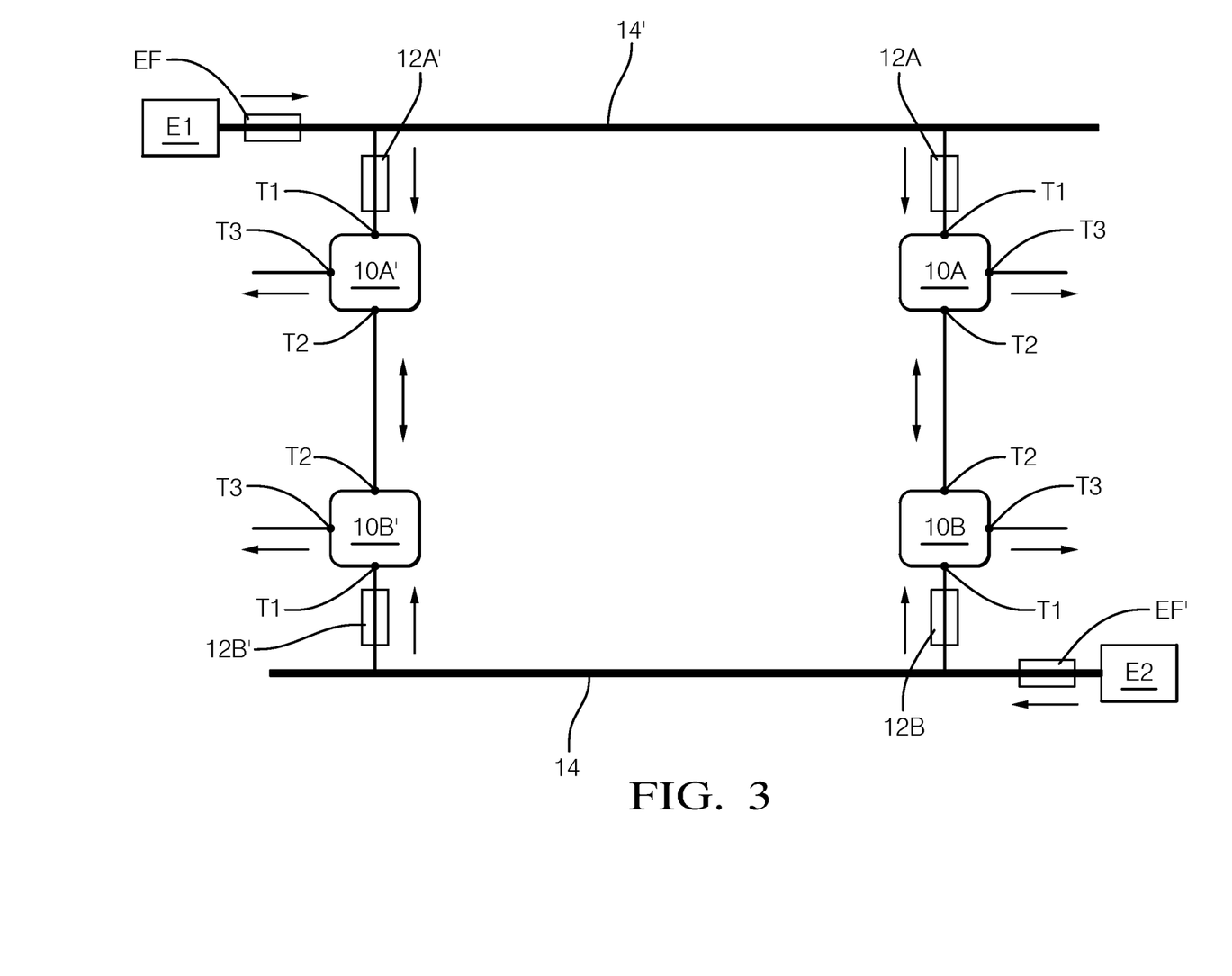
FIG. 3 shows two pairs of electronic circuits interposed between a first energy source and a second energy source for redundant supply of a load.

In FIG. 3, the third terminal T3 is located inside the circuit 10 so as to indicate that if the circuit 10 has a housing and/or is configured as a module (not shown) then the third terminal T3 is preferably not accessible from outside. In this case, the electric load can also be located inside the housing, wherein only the first and second terminals T1, T2 are accessible from outside in order to ensure redundant supply of the load. The circuit 10 can thus be integrated into an electric load.

The third terminal T3 can also be accessible from outside the circuit 10, in particular if the circuit 10 has a housing. In this case, the third terminal is preferably protected by a fourth electrical element. This will be shown in connection with FIG. 2 described further below.

When being installed for example in an autonomous vehicle (not shown) the first terminal T1 is electrically connected to a first battery (not shown) and the second terminal T2 is electrically connected to a second battery (not shown). An electric load (not shown) is electrically connected to the third terminal T3, wherein the load should be electrically supplied by either the first battery or the second battery. Per default the load should be supplied by the first battery via the first terminal T1 and the third terminal T3. In this default case the load should not be supplied by the second battery via the second terminal T2 and the third terminal T3. This is to say the second battery represents a backup supply for the load. In this context, the circuit 10 ensures a redundant supply for the electric load, which is to say that in case of an error with respect to the supply by means first battery the second battery should automatically take over supply. The supply is then completely switched from the first battery to the second battery.

The circuit 10 of FIG. 1 comprises a plurality of electrical switches interposed between the terminals T1, T2, T3, namely first switch Q1, second switch Q2 and third switch Q3. These switches Q1, Q2, Q3 are preferably each formed by N-type MOSFETs, wherein the switching state can conveniently controlled by a voltage supplied to the gate of the MOSFET, as the skilled person knows. The first switch Q1 connects the first terminal T1 with the third terminal T3 (via the drain and the source of the MOSFET Q1). The second switch Q2 connects the second terminal T2 with the third switch Q3 and the third switch Q3 connects the second switch Q2 with the third terminal T3. This is to say that the second terminal T2 is connected with the third terminal T3 via the second and third switches Q2 and Q3. Moreover, the first terminal T1 is connected with the second terminal T2 via the first, third, and second switches Q1, Q3, and Q2.

The first switch Q1 is configured as a diode D1, see encircled diode D1 in FIG. 1. In other words, the first switch Q1 implements, i.e. behaves like a diode so as to enable power flow from the first terminal T1 through the first switch Q1 but not vice versa. It is understood that the diode D1 is merely an interpretation of the functionality of the first switch Q1 but is not an additional physical element of the circuit 10. Likewise, the elements F1, S1, and D2 encircled in FIG. 1 represent functional interpretations of the second switch Q2 and the third switch Q3. The second switch Q2 corresponds with the functionality of a fuse F1, i.e. if the current through the second switch Q2 exceeds a predefined threshold the second switch Q2 will switch off thereby disabling any power flow through the second switch Q2 (until the second switch Q2 will be reset). Otherwise power flow through the second switch Q2 will be possible with respect to the second switch Q2.

The functionality of the third switch Q3 corresponds with a parallel configuration of a diode D2 and a switch S1. In view of the diode D2, the third switch Q3 avoids power flow from the second terminal T2 through the third switch T3 but allows power flow vice versa. This functionality of the diode D2 holds if the switch S1 is open, as shown in FIG. 1. Per default the switch S1 is open. However, if the voltage at the first terminal T1 falls below a predefined threshold the switch S2 is closed. In this case, the functionality of the diode D2 is deactivated and power flow through the third switch Q3 is enabled in both directions.

The functionality of the switches Q1, Q2, and Q3 is further described in the following by way of exemplary error scenarios.

As one example of an erroneous supply state at the first terminal T1 a short at the first terminal T1 will cause a drop of voltage and/or an increase of current which can be detected by monitoring a threshold condition with respect to voltage and/or current. Due to the short at the first terminal T1 the threshold condition is violated and in response to this violation the third switch Q3 is switched on thereby allowing power flow through the third switch Q3. This corresponds to a closing of the switch S1. Furthermore, an external fuse will be activated in response of the short and protect the first terminal T1. The first switch Q1 will avoid a flow of power from the second terminal T2 to the first terminal T1 (functionality of the diode D1). In this way, supply of the electric load is maintained, wherein supply via the first terminal T1 is deactivated and supply via the second terminal T2 is activated.

As one example of an erroneous supply state at the second terminal T2 a short at the second terminal T2 will cause a drop of voltage and/or an increase of current which leads to switching off of the second switch Q2. In other words, if a threshold condition is violated at the second terminal T2 the second switch Q2 latches like a fuse thereby disabling power flow through the second terminal T2. The external fuse before the first terminal T1 (not shown in FIG. 1) will not latch due to a different threshold condition of the external fuse. Therefore, supply of the electric load is maintained via the first terminal T1.

Figure 2:
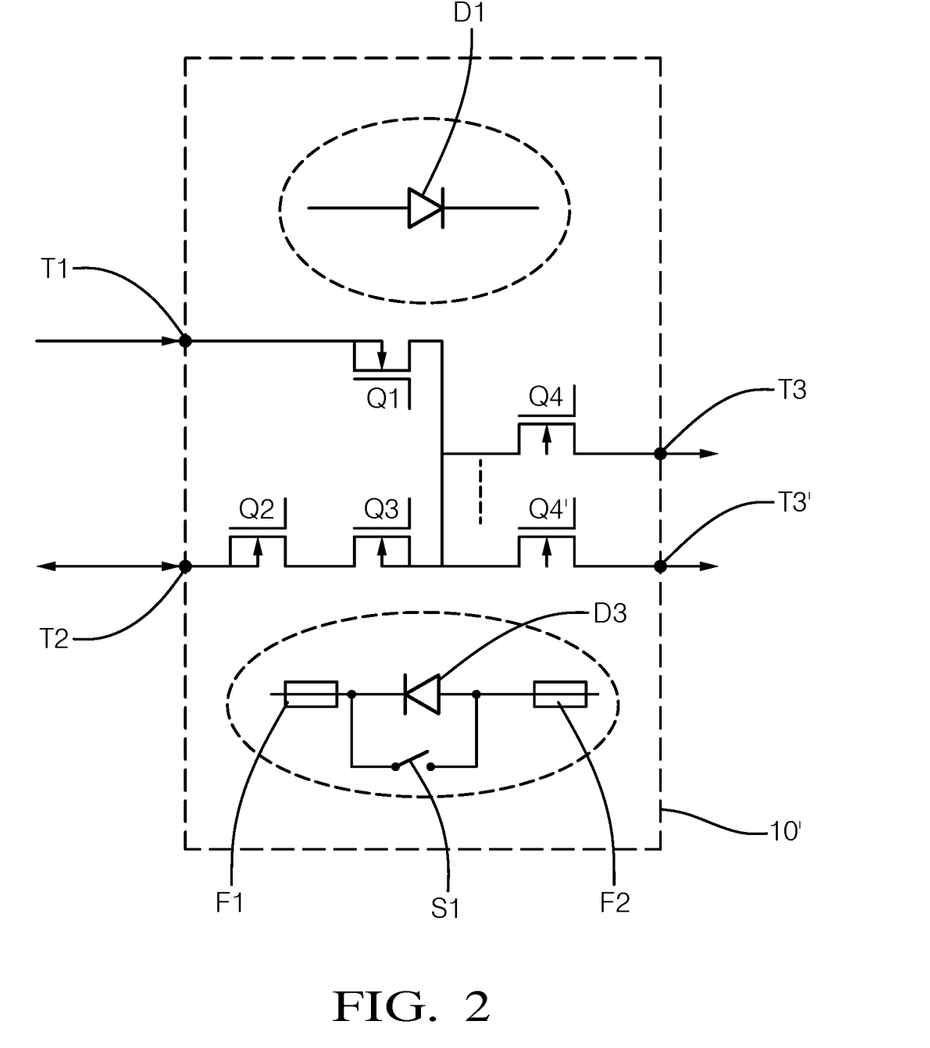
FIG. 2 schematically shows another electronic circuit for redundant supply of a load.

FIG. 2 shows an electronic circuit 10' which essentially corresponds to the electronic circuit 10 of FIG. 1. It deviates from the circuit 10 of FIG. 1 in that the circuit 10' further comprises a further third terminal T3'. In addition, the circuit 10' comprises a plurality of fourth electrical switches, namely switches Q4 and Q4', wherein switch Q4 protects the third terminal T3 and switch Q4' protects the further third terminal T3'. The functionality of the fourth switches Q4, Q4' each corresponds to fuse F2 encircled in FIG. 2. This is to say that if a current through the fourth switches Q4, Q4' exceed a threshold (or voltage falls below another threshold) the fourth switches Q4, Q4' will latch like a fuse, i.e. they will disable any power flow through themselves thereby protecting the corresponding terminals T3, T3'. At the same time the supply state with respect to the first terminal T1 and the second terminal T2 will not be affected. This allows for employing the circuit 10' for supplying another electric load via a further circuit 10 through the second terminal T2, as will be explained in the following. It is understood that the switches Q4, Q4' work independently, thereby ensuring that the third terminals T3, T3' are only selectively disconnected in dependence of an error at the third terminals T3, T3'.

As indicated in FIG. 2, the third terminals T3, T3' are located on the border of the circuit 10'. This indicates that if the circuit 10' is configured as a module and/or has a housing then the third terminals T3, T3' are preferably accessible from outside the module or housing, i.e. forming outlet terminals of the circuit 10'. Due to the fourth switches Q4, Q4' this is not safety critical. Nevertheless, the third terminals T3, T3' can also be located inside the circuit 10', as indicated in connection with FIG. 1. The first and second terminals T1, T2 are preferably configured as inlet terminals accessible from outside.

FIG. 3 shows an electronic circuit arrangement comprising two pairs of electronic circuits, namely a first pair of electronic circuits 10A, 10B and a second pair of electronic circuits 10A', 10B'. Each of the electronic circuits 10A, 10A', 10B' is preferably configured like the electronic circuit 10' from FIG. 2 or the electronic circuit 10 from FIG. 1. As can be seen from FIG. 3 the second terminals T2 of the first pair of electronic circuits 10A, 10B are electrically interconnected to each other. Likewise, the second terminals T2 of the second pair of electronic circuits 10A', 10B' are also electrically interconnected to each other.

The first terminals T1 of the electronic circuits 10A, 10A' are each connected to a first battery E1 via a shared connection 14', wherein a first fuse 12A is interposed between the first terminal T1 of the circuit 10A and the first battery E1, and another first fuse 12A' is interposed between the first terminal T1 of the circuit 10A' and the first battery E1. Likewise, the first terminals T1 of the electronic circuits 10B, 10B' are each connected to a second battery E2 via a shared connection 14, wherein second fuses 12B, 12B' are interposed between the first terminals T1 and the second battery E2. The first and second fuses 12A, 12A', 12B, 12B' are for protecting the first terminals T1 and can thus be regarded as external fuses for the electronic circuits 10A, 10B, 10A', 10B'.

Additional fuses EF, EF' are interposed between the batteries E1, E2 and the shared connections 14, 14', respectively.

As can be seen from FIG. 3 the pairs of electronic circuits 10A, 10B, 10A', 10B' and the shared connections 14, 14' together from an electrical ring (or a part of a ladder structure) for redundant supply of a plurality of electric loads via the third terminals T3 of the electronic circuits 10A, 10B, 10A', 10B'. In this way, the necessary wiring for the supply of the electric load is reduced. It is understood that further pairs of electronic circuits can be interposed between the first battery E1 and the second battery E2 via the shared connections 14, 14' thereby forming a ladder structure.

If no erroneous supply state is detected the electric loads connected to the third terminals T3 of the electronic circuits 10A, 10A' will be supplied via the first terminals T1 of the electronic circuits 10A, 10A' (but not via the second terminals T2) Likewise, the electric loads connected to the third terminals T3 of the electronic circuits 10B, 10B' will be supplied via the first terminals T1 of the electronic circuits 10B, 10B'. However, if an erroneous supply state is for example detected at the first terminal of the circuit 10B the electric load connected to the third terminal T3 of the circuit 10B will be supplied via the second terminal T2 of the circuit 10B. This is to say that power flow will be enabled from the first battery E1 first and second terminals T1, T2 of the circuit 10A. Accordingly, supply will be switched to the respective "secondary energy source" connected via the second terminals T2 if an erroneous supply state would be detected at the respective first terminals T1 of the other circuits 10A, 10A', 10B'.

The electric loads connected to the third terminals T3 of the circuits 10A, 10B, 10A', 10B' do not necessarily need to be different electric loads. It is possible that a given electric load comprises two supply terminals which could be selectively used for redundant supply. For example, the third terminals T3 of the electronic circuits 10A, 10B can be redundant supply terminals of an electric load. The electric load can be for example a camera used for autonomous driving or a control module having safety-critical relevance for autonomous driving.

The electronic circuit arrangement of FIG. 3 also includes a plurality of arrows for indicating possible directions of power flow. As can be seen, power flow between the interconnected second terminals T2 is possible in both directions, however, power flow from the batteries E1, E2 is only possible towards the first terminal T1, but not vice versa. This is also indicated by bidirectional arrows before the second terminals T2 and unidirectional arrows before the first terminals T1 in FIG. 1 and FIG. 2. This functionality is realised by the first switch Q1 and the third switch Q3 and can insofar be interpreted as the diodes D1 and D2.

REFERENCE SIGNS 10, 10' electronic circuit
T1 first terminal
T2 second terminal
T3, T3' third terminal
Q1 first switch
Q2 second switch
Q3 third switch
D1 diode
D3 diode
F1 fuse
S1 switch
F2 fuse
Q4, Q4' fourth switch
10A, 10A' first electronic circuit
10B, 10B' second electronic circuit
E1 first battery
E2 second battery
12A, 12A' fuse
12B, 12B' fuse
EF, EF' fuse
14, 14' shared connection

I claim:

1. An electronic circuit for redundant supply of an electric load, comprising:
   a plurality of terminals including at least a first terminal, a second terminal and at least one third terminal, wherein:
   the first terminal is configured to be connected to a first energy source for primary supply of the electric load;
   the second terminal is configured to be connected to a second energy source for secondary supply of the electric load; and
   the at least one third terminal is configured to be connected to the electric load;
   a plurality of electrical components interposed between the first terminal, the second terminal and the at least one third terminal, the plurality of electrical components being configured to:
   enable power flow from either the first terminal or the second terminal to the at least one third terminal in dependence of an erroneous supply state for the electric load;
   detect an erroneous supply state at the first terminal;
   connect the first terminal to the at least one third terminal in order to enable power flow from the first terminal to the at least one third terminal; and
   disconnect the second terminal from the first terminal and the at least one third terminal in order to disable power flow from the second terminal to the first terminal and the at least one third terminal when the erroneous supply state is not detected at the first terminal.

2. The electronic circuit according to claim 1, wherein the electronic circuit is further configured to:
   disconnect the first terminal from the at least one third terminal and the second terminal in order to disable the power flow from the first terminal to the at least one third terminal and the second terminal; and
   connect the second terminal to the at least one third terminal in order to enable power flow from the second terminal to the at least one third terminal when the erroneous supply state at the first terminal is detected.

3. The electronic circuit according to claim 1, wherein the plurality of electrical components comprises at least one first electrical component configured to:
   enable power flow from the first terminal to the at least one of a third terminal and the second terminal; and
   disable current flow from the at least one third terminal and the second terminal to the first terminal.

4. The electronic circuit according to claim 1, wherein an at least one first electrical component is a first electrical switch.

5. The electronic circuit according to claim 1,
   wherein the plurality of electrical components are further configured to:
   detect an erroneous supply state at the second terminal, the erroneous supply state at the second terminal comprising an electrical measurand at the second terminal that violates a threshold condition;
   enable power flow between the second terminal and one of the first terminal and the at least one third terminal when the erroneous supply state at the second terminal is not detected; and
   disable power flow between the second terminal and one of the first terminal and the at least one third terminal when the erroneous supply state at the second terminal is detected.

6. The electronic circuit according to claim 5, wherein the electrical measurand is a current.

7. The electronic circuit according to claim 5,
   wherein the plurality of electrical components comprise a second electrical switch, the second electrical switch being configured to enable or disable the power flow between the second terminal and the one of the first terminal and the at least one third terminal based on whether the erroneous supply state at the second terminal is detected.

8. The electronic circuit according to claim 1,
   wherein the plurality of electrical components are further configured to:
   detect an erroneous supply state at the first terminal, the erroneous supply state at the first terminal comprising an electrical measurand at the first terminal that violates a threshold condition;
   enable power flow from the second terminal to the at least one third terminal when the erroneous supply state at the first terminal is detected; and
   disable power flow from the second terminal to one of the first terminal and the at least one third terminal when the erroneous supply state at the first terminal is not detected.

9. The electronic circuit according to claim 8, wherein the electrical measurand is a voltage.

10. The electronic circuit according to claim 8,
    wherein the plurality of electrical components comprise a third electrical switch, the third electrical switch being configured to enable or disable the power flow between the second terminal and the at least one third terminal or the second terminal and the one of the first terminal and the at least one third terminal based on whether the erroneous supply state at the second terminal is detected.

11. The electronic circuit according to claim 8,
    wherein plurality of electrical components comprise a third electrical component, the third electrical component configured to enable the power flow from the first terminal to the second terminal when the erroneous supply state at the first terminal is not detected.

12. The electronic circuit according to claim 1,
wherein the plurality of electrical components are further configured to:
detect an erroneous supply state at the at least one third terminal, the erroneous supply state at the at least one third terminal comprising an electrical measurand at the at least one third terminal that violates a threshold condition;
enable power flow between the at least one third terminal and one of the first terminal and the second terminal when the erroneous supply state at the at least one third terminal is not detected; and
disable power flow between the at least one third terminal and one of the first terminal and the second terminal when the erroneous supply state at the at least one third terminal is detected.

13. The electronic circuit according to claim 1, further comprising a plurality of third terminals, wherein the plurality of electrical components are further configured to detect an erroneous supply state at each of the plurality of third terminals, the erroneous supply state at one of the plurality of third terminals comprising a current at the one of a plurality of third terminals that violates a threshold condition, wherein the plurality of electrical components comprise a plurality of fourth electrical components, each of the plurality of fourth electrical components connected to one of the plurality of third terminals and configured to:
enable power flow between the one of the plurality of third terminals and one of the first terminal and the second terminal when the erroneous supply state at the one of the plurality of third terminals is not detected; and
disable power flow between the one of the plurality of third terminals and one of the first terminal and the second terminal when the erroneous supply state at the one of the plurality of third terminals is detected.

14. The electronic circuit according to claim 1,
further comprising a first electronic circuit and a second electronic circuit, wherein the second terminal of the first electronic circuit is connected to the second terminal of the second electronic circuit.

15. The electronic circuit according to claim 14,
wherein the first electronic circuit and the second electronic circuit form a pair of electronic circuits interposed between the first energy source and a second energy source.

16. The electronic circuit according to claim 15,
wherein the first terminal of the first electronic circuit is connected to the first energy source via a first fuse, and
wherein the first terminal of the second electronic circuit is connected to the second energy source via a second fuse, and
wherein the first fuse and the second fuse are configured to:
enable power flow through a protective electrical element when an electrical measurand at the protective electrical element meets a threshold condition; and
disable power flow through the protective electrical element when the electrical measurand, at the protective electrical element violates the threshold condition.

17. The electronic circuit according to claim 15,
wherein a plurality of pairs of first electronic circuits and second electronic circuits are interposed between the first energy source and the second energy source,
wherein each of the plurality of pairs of first electronic circuits and second electronic circuits are connected to the first energy source and the second energy source via their first terminals, respectively, and
wherein the first energy source and the second energy source share a first common protective electrical element and a second protective electrical element for connecting to the plurality of pairs of first electronic circuits and second electronic circuits, respectively.

18. A method for redundant supply of an electric load in dependence of an erroneous supply state in an electronic circuit; wherein
a first terminal of the electronic circuit is connected to a first energy source for primary supply of the electric load;
a second terminal of the electronic circuit is connected to a second energy source for secondary supply of the electric load;
at least one third terminal of the electronic circuit is connected to the electric load;
wherein the method comprises:
enabling power flow from the first terminal to the at least one third terminal and disabling power flow from the second terminal to the at least one third terminal and the first terminal when an erroneous supply state at the first terminal is not detected;
enabling the power flow from the second terminal to the at least one third terminal and disabling the power flow through the first terminal when an erroneous supply state at the first terminal is detected.

* * * * *